Figure 1:
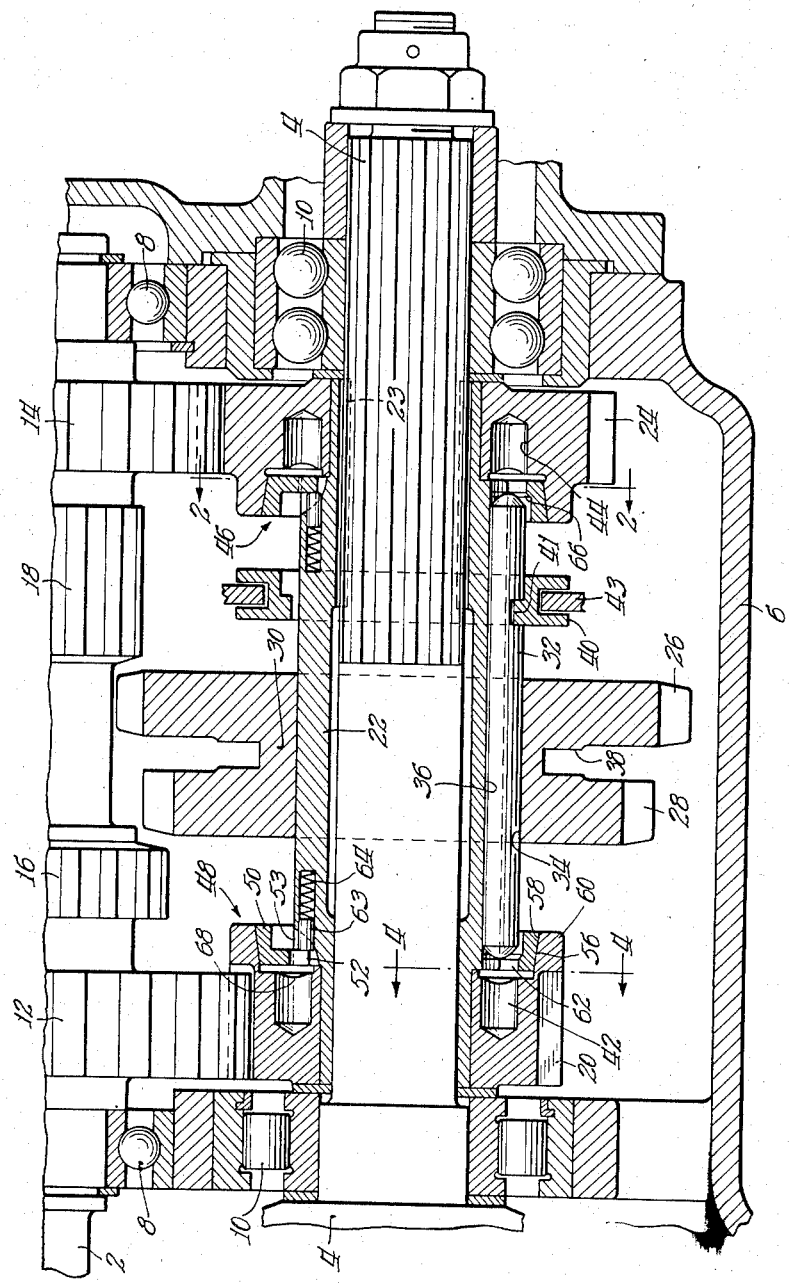

Aug. 7, 1951  D. W. KELBEL  2,563,726
MULTIPLE SYNCHRONIZING CLUTCH CONSTRUCTION
Filed June 26, 1946  2 Sheets-Sheet 1

Inventor:
Donald W. Kelbel
By Edward C. Gritzbaugh
Atty.

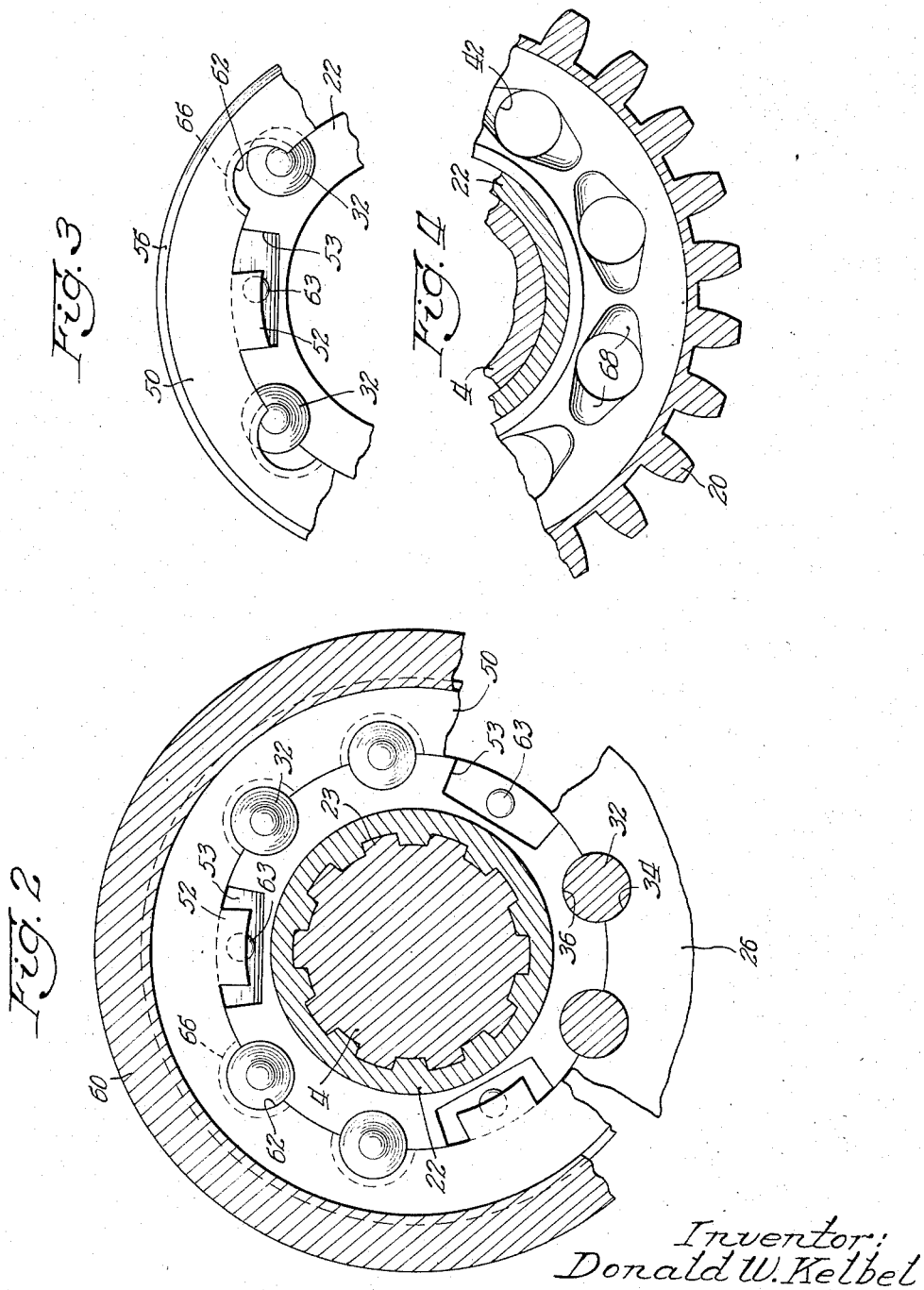

Patented Aug. 7, 1951

2,563,726

UNITED STATES PATENT OFFICE 2,563,726

MULTIPLE SYNCHRONIZING CLUTCH CONSTRUCTION

Donald W. Kelbel, Muncie, Ind., assignor to Borg-Warner Corporation, Chicago, Ill., a corporation of Illinois Application June 26, 1946, Serial No. 679,422

15 Claims. (Cl. 192—53)

1

This invention relates to synchronizing change-speed gear transmission of the type employed, for example, in motor vehicles, wherein there is provided means for effecting synchronization of a pair of pairs of torque-transmitting members preparatory to connecting said members in positive drive engagement with each other by means of axially movable position drive elements.

An object of the invention is to provide a synchronizing transmission of the type wherein the synchronizing means comprises friction clutch elements adapted to become drivingly engaged with each other in the initial stage of shifting movement, as a result of axial thrust transmitted to one of such elements from the movable positive drive elements, and wherein there is incorporated so-called "blocker" mechanism for preventing the positive drive engagement of the torque-transmitting members prior to the time that synchronization is effected.

Another object of the invention is to provide a synchronizing transmission of the blocker type wherein the positive drive elements for drivingly connecting the torque-transmitting members comprise shift pins rotatable with one of said members and movable axially thereof for positive drive engagement with the other member and adapted, during initial shift, to cooperate with the synchronizing means to initiate the blocking and synchronizing function and thereafter to establish a positive drive connection between said members.

Another object of the invention is to provide a synchronizing transmission embodying a blocker mechanism including a balking synchronizing ring carried by one of the torque-transmitting members and axially shiftable into frictional engagement with a clutch element fixed to the other torque transmitting member by biasing means adapted to transmit axial thrust and thereby to cause the ring to be constantly biased into its blocking position with respect to the clutch element during relative rotation of said members, said ring being engageable by the shiftable positive drive pins to establish a friction drive with said clutch element and thereby between said members and blocking initial movement of said pins until synchronism is effected between the members and thereafter permitting passage of the pins therethrough and into engagement with the other member to establish a positive drive connection between said members.

Other objects, the advantages and uses of the invention will become apparent after reading the following specification and claims, and after consideration of the drawings forming a part of the specification, wherein:

Fig. 1 is a view, partially in side elevation and partially in vertical section through a variable speed transmission constructed in accordance with the invention;

Figs. 2 and 3 are fragmentary views in section taken substantially on the line 2—2 of Fig. 1, illustrating successive positions of the synchronizing device during a gear ratio changing operation; and Fig. 4 is a sectional view taken substantially on line 4—4 of Fig. 1.

Referring to the drawings, in Fig. 1 is shown a motor vehicle transmission comprising a drive shaft 2 and a driven shaft 4 mounted in a housing or transmission case 6. The drive shaft 2 is suitably journaled in the housing 6 as by the bearings 8, 8 and is driven from the vehicle engine through a conventional friction clutch mechanism (not shown). The driven shaft 4 is also suitably journaled in the housing 6 by means of the bearings 10, 10 and is adapted to be connected to the propeller shaft (not shown) to transmit drive thereto.

The drive shaft 2 is formed with a number of integral gears 12, 14, 16 and 18. Of these gears, the gear 12 is in constant mesh with the gear 20, which is mounted for rotation on the reduced end of a sleeve 22 surrounding the driven shaft 4, and which has its opposite end splined thereto as at 23. The gear 14 is in constant mesh with a gear 24, which is suitably journaled on the reduced splined end of the sleeve 22. While the gears 20 and 24 are illustrated as being journaled on the sleeve 22, the gears may be journaled on the shaft 4, if desired.

Gears 18 and 16 constitute the first and second speed gears respectively and gear 18 is adapted to mesh with a gear 26 and the gear 16 is adapted to mesh with a gear 28. Both gears 26 and 28 are formed integrally with the gear hub 30 surrounding the sleeve 22 and connected to rotate with the sleeve 22 by means of six pins 32 which are spaced from one another about the circumference of the sleeve and disposed parallel to the axis thereof, each pin being disposed in annular openings defined by the opposed arcuate grooves 34 and 36 in the gear hub 30 and the sleeve 22 respectively and which extend parallel to the axis of the hub and sleeve from end to end thereof, whereby relative rotation of said sleeve and hub are prevented by the pins, while movement of the hub axially of the sleeve is permitted.

Sliding action of the gear hub 30 axially of the sleeve 22 for effecting meshing of the gears 26 and 28, carried by said hub, with the gears 16 and 18 respectively, is effected in the usual way by means of a shifter fork (not shown), which engages in a groove 38 in the body of the hub 30. Thus, in the illustrated embodiment of the invention, the gear hub 30 may be moved to mesh the gear 26 with the gear 18 to provide a first speed, or to mesh the gear 28 with the gear 16 to provide a second speed.

The transmission is also adapted to provide third and fourth speeds by connecting the constant mesh gears 24 and 20 respectively to the driven shaft 4. For this purpose, the pins 32 are connected together for conjoint axial movement by means of a shifter ring 40 surrounding the sleeve 22 and disposed in radial coplanar slots 41 in the pins 32 adapted to receive a shifter fork 43 to selectively connect either the gear 20 or the gear 24 to effect the desired speed ratio. Third speed is obtained by movement of the ring 40 and thereby the pins 32 toward the constant mesh gear 24 and into six of a series of nine equally spaced openings 44 formed therein to thereby lock the gear by the pins to the sleeve 22 rotatable with the driven shaft 4. To obtain fourth speed, the pins 32 are moved toward the gear 20 and into six of the nine openings 42 therein for drivingly connecting the gear 20 to the sleeve 22 and thereby to the shaft 4. Such engagement of the pins 32 with either the gear 20 or the gear 24 may not take place, however, without shock to the parts and injury thereto, unless the sleeve 22 and driven shaft 4 are rotated at the same speed as the selected gear and are in synchronism therewith.

In order to establish synchronism between the shaft 4 and either the gear 20 or the gear 24, synchronizing devices generally indicated at 46 and 48 are provided which are adapted to bring the driven shaft 4 and the gear 20 or 24 to the same speed or rotation before a positive drive is effected by the engagement of the pins 32 with the gear selected to provide the desired speed ratio.

Each of these devices 46 and 48 associated with the gears 20 and 24 and sleeve 22, comprises a synchronizing clutch member or ring 50 surrounding the sleeve 22 and being axially slidable thereon and rotatable therewith by means of tongues or drive lugs 52, 52 on the inner periphery of the ring fitting within milled slots 53 of the sleeve 22. The ring 50 is formed with a conical outer surface 56 engageable with a complementary inner surface 58 on an inwardly directed annular flange 60 formed on the adjacent gear to establish a friction drive connection between the gear and the driven shaft during initial shifting movement of the pins 32 toward the gear to obtain synchronism of the speed of the gear and the shaft 4. The ring 50 is also provided with a plurality of axially extending arcuate openings 62 within which may be received the pins 32 during further axial movement of the latter toward the selected gear for reception in the openings in the gear to drivingly connect the latter to the shaft 4.

Each synchronizing device is also effective to prevent the entrance of the pins 32 into the openings in the selected gear for positively drivingly connecting the gear and the driven shaft 4 until the speed of rotation of the driven shaft 4 and thereby the pins have been brought to the same speed as the gear. To this end, the synchronizer ring 50 also serves as a balking ring and it may be noted that the lugs 52, 52 of the ring, fitting in the slots 53, 53 in the splined sleeve 22, are of substantially less width than the slot to permit relative rotation of the lugs and sleeve, within limits, whereby each lug of the ring may roll from one side of the associated slot to the other side with enough angular travel to block and unblock the pins 32 in their axial movement toward the gear selected and into the openings in the ring and the selected gear.

Each ring 50 is constantly urged into frictional engagement with the annular surrounding flange 60 of the adjacent gear by the pressure of spring-pressed plungers 63 disposed within holes 64 drilled in the ends of the sleeve 22 and communicating with the slots 53 therein. The plungers 63 thus engage the lugs 52, 52 on the rings 50 to push the rings into engagement with the associated gears and thereby act to maintain a constant frictional drag by the rings 50 on the mating flanges 60 of the gears to prevent the alignment of the arcuate openings 62 of the ring 50 and the arcuate grooves 36 of the sleeve 22, in which grooves are slidably disposed the pins 32, as shown in Fig. 3, whereby the passage of the pins through the arcuate openings 62 of the rings 50 and into the openings 42 of the gear 20 or the openings 44 of the gear 24 is blocked. It may also be noted that the plungers 63 are operative to permit each ring 50 to center itself with respect to the flanges 60 of the gears by the pressure exerted on the rings by the plungers 63.

To facilitate the entrance of the pins 32 into the arcuate openings 62 in the rings 50, before passage of the pins through either of the rings 50 and through the openings 42 of the gear 20 or the openings 44 of the gear 24 to establish a driving connection, the sides of the rings 50 facing opposite ends of the pins 32 have a chamfered area surrounding each arcuate opening 62 therein to provide a cam surface 66 for engagement with the adjacent rounded end of one of the pins to assist in guiding the pin end into an opening 62 in the ring 50 and it may also be noted that the area surrounding each opening 42 in the gear 20 and each opening 44 in the gear 24 is provided with a similar cam surface 68 for a similar purpose.

In the operation of the synchronizing devices 46 and 48, presuming the transmission to be in its neutral position and that third speed is desired, it will be apparent that the synchronizer rings 50 are biased into their pin-blocking position by the frictional drag thereon due to the constant rotation of the gears 20 and 24 of the sleeve 22. To secure third speed, the pins are shifted toward the gear 24 and first come into contact with the cam surfaces 66 of the ring 50 associated with the gear which blocks their entrance into the openings 62 in the ring 50 and the openings 44 in the gear 24 when sufficient pressure is applied to the pins to force the rounded ends thereof into engagement with the surfaces 66 of the rings. This additional pressure exerted on the ring 50 serves to urge the conical friction surface thereof into tight engagement with the complementary surface on the flange 60 of the gear 24 to cause rotation of the ring in the same direction as the gear and thereby to rapidly bring the gear 24 to the speed of the synchronizing ring and to cause synchronization of the ring and gear at which time the pins may be shifted through the ring inasmuch as the engagement of the rounded ends of the pins with the cam surfaces of the ring 50 will cause ring 50 to rotate relative to the sleeve 22 to permit alignment of the pin-receiving grooves 36 in the sleeve 22 with six of the openings 62 in the ring for the passage of the pins through the ring and thereafter into engagement with the cam surfaces 68 of the gear 24 and into the openings 44 in the gear 24 to establish a positive drive connection between the gear and the driven shaft 4.

To secure fourth speed, the operation of the synchronizing device 48 for effecting a friction drive between the gear 20 and the driven shaft 4 to cause the shaft 4 to rotate at the same speed as the gear 20 prior to the positive drive engagement of the pins 32 and gear 20, is identical to that of the operation of the device 46. However, in this case, the pins 32 are shifted toward the gear 20 and in the initial shifting movement of the pin, the pins exert pressure on the synchronizer ring 50, associated with the gear 20, which is transmitted by the ring 50 to the annular flange 60 of the gear 20 to secure synchronism of the gear 20 with the driven shaft 4, the ring 50 thereafter rotating relative to the sleeve 22 to unblock the passage of the pins through the ring 50 and into the gear 20 to establish a positive drive between the shaft 4 and the gear 20.

While a specific embodiment of the invention has been herein described, it is to be understood that it is by way of example rather than limitation, and it is intended that the invention be defined by the appended claims which should be given a scope as broad as consistent with the prior art.

I claim:

1. In a synchronizing transmission, a torque-transmitting shaft, a sleeve surrounding said shaft and rotatable therewith, spaced gears rotatably mounted and axially fixed on said sleeve and having transverse openings therein, a plurality of pins between said gears and carried by and rotatable with said sleeve and shiftable axially thereof, balking rings rotatable with said sleeve and also rotatable relative thereto, within limits, into and out of balking position, and each ring having a friction face coacting with a friction face on an adjacent gear, each ring being formed with transverse passages therethrough for said pins, spring means carried by said sleeve and operative to urge each ring into frictional engagement with the adjacent gear to impose a constant dragging friction on said gear and thereby rotate said rings relative to said sleeve to block the passage of the pins into the openings in the rings, and means for selectively shifting said pins toward one or the other of said gears to contact and urge the associated balking ring into frictional drive engagement therewith to synchronize the speed of rotation of the selected gear and said shaft and thereafter to rotate the ring for passage of the pins through the passages therein and into the openings in the selected gear to establish a positive drive connection between the selected gear and said shaft.

2. In a synchronizing transmission, a torque-transmitting shaft, a sleeve surrounding said shaft and rotatable therewith, spaced torque-transmitting members rotatably mounted and axially fixed on said sleeve and having passages therein, a plurality of pins between said members and carried by and rotatable with said sleeve and shiftable axially thereof, balking rings rotatable with said sleeve and also rotatable relative thereto, within limits, into and out of balking position, and each ring having a friction face coacting with a friction face on an adjacent member, each ring being formed with transverse openings therethrough for said pins, spring means carried by said sleeve and operative to urge each ring into frictional engagement with the adjacent member to impose a constant dragging friction on said member and thereby rotate said rings relative to said sleeve to block the passage of the pins into the openings in the rings, and means for selectively shifting said pins toward one or the other of said members to contact and urge the associated balking ring into frictional drive engagement therewith to synchronize the speed of rotation of the selected member and said shaft and thereafter to rotate the ring for passage of the pins through the openings therein and into the passages in the selected member to establish a positive drive connection between the selected member and said shaft.

3. In a synchronizing transmission, a torque-transmitting shaft, a sleeve surrounding said shaft and rotatable therewith, spaced gears rotatably mounted and axially fixed on said sleeve, a plurality of positive drive elements between said gears and carried by and rotatable with said sleeve and shiftable axially thereof, said elements and said gears having engageable coupling portions for establishing a positive drive connection, balking rings rotatable with said sleeve and also rotatable relative thereto, within limits, into and out of balking position, and each ring having a friction face coacting with a friction face on an adjacent gear, each ring being formed with transverse passages therethrough for said elements, spring means carried by said sleeve and operative to urge each ring into frictional engagement with the adjacent gear to impose a constant dragging friction on said gear and thereby rotate said rings relative to said sleeve to block the passage of the elements into the passages in the rings, and means for selectively shifting said elements toward one or the other of said gears to contact and urge the associated balking ring into frictional drive engagement therewith to synchronize the speed of rotation of the selected gear and said shaft and thereafter to rotate the ring for passage of the elements through the passages therein and engagement of the coupling portions of said elements and the selected gear to establish a positive drive connection between the selected gear and said shaft.

4. In a synchronizing transmission, a torque-transmitting member, a pair of torque-transmitting elements rotatably mounted on said member, a plurality of pins carried by and rotatable with said member and shiftable axially thereof into engagement with either of said elements to establish a positive drive connection between the same and said member, synchronizing means comprising a balking ring adjacent each element, rotatable relative thereto and having a friction face coacting with a friction face on the adjacent element, said rings being rotatable with said member and axially shiftable relative thereto, each ring having axially extending openings therethrough for said pins and having rotation relative to said member, within limits, into and out of pin-balking position, means associated with said member and urging said rings into engagement with said elements with a constant frictional drag to rotate said rings into pin-balking position, and means connecting said pins for conjoint movement toward either of said elements to contact and urge the ring in the path of travel of said pins into frictional drive engagement with the element toward which the pins are shifted to synchronize the latter element and said member and thereafter to rotate the ring to permit passage of the pins through the openings in the ring and into openings in the latter element to positively drivingly engage the same and said member.

5. In a synchronizing transmission, a torque-transmitting member, a pair of torque-transmitting elements rotatably mounted on said member, positive drive means carried by and rotatable with said member and shiftable axially thereof into engagement with either of said elements to establish a positive drive connection between the same and said member, synchronizing means comprising a balking ring adjacent each element, rotatable relative thereto and having a friction face coacting with a friction face on the adjacent element, said rings being rotatable with said member and axially shiftable relative thereto, each ring having rotation relative to said member, within limits, into and out of balking position and being provided with at least one opening for guidingly receiving said positive drive means, spring means carried by said member and urging said rings into engagement with said elements with a constant frictional drag to rotate said rings into balking position upon energization of said member, and means for shifting said positive drive means toward either of said elements to contact and urge the ring in the path of travel of said positive drive means into frictional drive engagement with the selected element to synchronize the latter and said member and thereafter to rotate the ring out of balking position to permit passage of the positive drive means into the opening in the ring and into positive drive engagement with the selected element.

6. In a synchronizing transmission, a torque-transmitting member, a pair of gears rotatably mounted on said member, positive drive means carried by and rotatable with said member and shiftable axially thereof into engagement with either of said gears to establish a positive drive connection between the same and said member, said gears and said positive drive means having engageable coupling portions for establishing said positive drive connection, synchronizing means comprising a balking ring adjacent each gear, rotatable relative thereto and having a friction face coacting with a friction face on the adjacent gear, said rings being rotatable with said member and axially shiftable relative thereto, each ring having rotation relative to said member, within limits, into and out of balking position and being provided with at least one opening for guidingly receiving said positive drive means, spring means carried by said member and urging said rings into engagement with said gears with a constant frictional drag to rotate said rings into balking position upon energization of said member, and means for shifting said positive drive means toward either of said gears to contact and urge the adjacent ring in the path of travel of said positive drive means into frictional drive engagement with the selected gear to synchronize the latter and said member and thereafter to rotate the ring out of balking position to permit passage of the positive drive means into the opening in the ring and engagement of the coupling portions of said positive drive means and the selected gear.

7. In a transmission, in combination with driving and driven relatively rotatable members, an element carried by said driven member and axially shiftable into and out of engagement with the driving member to establish a driving connection therebetween, said driving member and said element having engageable coupling portions for establishing said driving connection a balking ring rotatable with said element and having a friction face for coacting with a friction face on said driving member, said ring being rotatable relative to said shiftable element, within limits, into and out of element-blocking position and being formed with a transverse passage therethrough within which said element may be slidably fitted and is normally located out of the same and engageable with said ring on one side or the other of said passage when out of alignment therewith, means effective to rotate said ring to position said passage out of alignment with said element upon relative rotation of said members, and means for shifting said element toward said driving member to contact and urge said ring into frictional driving engagement with said driving member to synchronize said members and thereafter to rotate said ring to align said passage with said element for passage of the latter therethrough and engagement of the coupling portions of said element and said driving member.

8. In a transmission, in combination with driving and driven relatively rotatable members, an element carried by said driven member and axially shiftable into and out of engagement with the driving member to establish a driving connection therebetween, said driving member and said element having engageable coupling portions for establishing said driving connection, a balking ring rotatable with said element and having a friction face for coacting with a friction face on said driving member, said ring being rotatable relative to said shiftable element, within limits, into and out of element-blocking position and being formed with a transverse passage therethrough within which said element may be slidably fitted and is normally located out of the same and engageable with said ring on one side or the other of said passage when out of alignment therewith, and means for shifting said element toward said driving member to contact and urge said ring into frictional driving engagement with said driving member to synchronize said members and thereafter to rotate said ring to align said passage with said element for passage of the latter therethrough and engagement of the coupling portions of said element and said driving member.

9. In a transmission, in combination with driving and driven relatively rotatable members, an element carried by said driven member and axially shiftable into and out of an opening in the driving member to establish a driving connection therebetween, a balking ring rotatable with said element and having a friction face for coacting with a friction face on said driving member, said ring being rotatable relative to said shiftable element, within limits, into and out of element-blocking position and being formed with a transverse passage therethrough within which said element may be slidably fitted and is normally located out of the same and engageable with said ring on one side or the other of said passage when out of alignment therewith, and means for shifting said element toward said driving member to contact and urge said ring into frictional driving engagement with said driving member to synchronize said members and thereafter to rotate said ring to align said passage with said element for passage of the latter therethrough and into the opening in said driving member.

10. In a transmission, in combination with driving and driven relatively rotatable members, a pin carried by said driven member and axially shiftable into and out of an opening in the driving member to establish a driving connection therebetween, a balking ring rotatable with said pin and having a friction face for coacting with a friction face on said driving member, said ring being rotatable relative to said pin, within limits, into and out of pin-blocking position and being formed with a transverse passage therethrough within which said pin may be slidably fitted and is normally located out of the same and engageable with said ring on one side or the other of said passage when out of alignment therewith, and means for shifting said pin toward said driving member to contact and urge said ring into frictional driving engagement with said driving member to synchronize said members and thereafter to rotate said ring to align said passage with said pin for passage of the latter therethrough and into the opening in said driving member.

11. In a transmission, in combination with driving and driven relatively rotatable members, an element carried by said driven member and axially shiftable into and out of engagement with the driving member to establish a driving connection therebetween, said element and driving member being provided with engageable coupling means for establishing said driving connection, a balking ring rotatable with said element and having a friction face for coacting with a friction face on said driving member, said ring being rotatable relative to said shiftable element, within limits, into and out of element-blocking position and being formed with a transverse passage therethrough within which said element may be slidably fitted and is normally located out of the same and engageable with said ring on one side or the other of said passage when out of alignment therewith, spring means operatively urging said ring into engagement with said driving member with a constant frictional drag to rotate said ring to position said passage out of alignment with said element, and means for shifting said element toward said driving member to contact and urge said ring into frictional driving engagement with said driving member to synchronize said members and thereafter to rotate said ring to align said passage with said element for passage of the latter therethrough and engagement of the coupling means of said element and said driving member.

12. In a transmission, in combination with driving and driven relatively rotatable members, an element carried by said driven member and axially shiftable into and out of an opening in the driving member to establish a driving connection therebetween, a balking ring rotatable with said element and having a friction face for coacting with a friction face on said driving member, said ring being rotatable relative to said shiftable element, within limits, into and out of element-blocking position and being formed with a transverse passage therethrough within which said element may be slidably fitted and is normally located out of the same and engageable with said ring on one side or the other of said passage when out of alignment therewith, spring means operatively urging said ring into engagement with said driving member with a constant frictional drag to rotate said ring to position said passage out of alignment with said element, and means for shifting said element toward said driving member to contact and urge said ring into frictional driving engagement with said driving member to synchronize said members and thereafter to rotate said ring to align said passage with said element for passage of the latter therethrough and into the opening in said driving member.

13. In a transmission, in combination with driving and driven relatively rotatable members, an element carried by one of said members for rotation therewith and axially shiftable toward the other member, said element having an axially directed tapered end portion and said other member having an opening for receiving said end portion of said element whereby to provide engageable coupling means for establishing a driving connection therebetween, synchronizing means disposed between said element and other member and comprising a balking member adapted to be engaged by said end portion of said element and frictionally engaged with said other member when axially shifted toward said other member, said balking member having an opening therein permitting the passage of said end portion of said element and engagement of the end portion of said element with the opening of said other member to establish said driving connection when said driving and driven members are synchronized.

14. In a transmission, in combination with driving and driven relatively rotatable members, an element carried by one of said members for rotation therewith and axially shiftable toward the other member, said element having an axially directed tapered end portion and said other member having an opening for receiving said end portion of said element whereby to provide engageable coupling means for establishing a driving connection between said driving and driven members, means for synchronizing the driving and driven members prior to engagement of said coupling means of said element and other member to establish said driving connection and including a synchronizing member disposed between said element and said other member and engageable by said end portion of said element when axially shifted toward the other member to frictionally engage said other member to synchronize the speeds of said driving and driven members, said synchronizing member being relatively rotatable to said element and said other member into and out of element-blocking position and being provided with a passage within which said end portion of said element may be slidably fitted and is normally located out of the same and engageable with the synchronizing member on one side or the other of said passage when out of alignment therewith, said synchronizing member aligning said passage with said element upon synchronization of said driving and driven members for passage of said end portion of said element through said passage and engagement of the end portion of said element with the opening of said other member to establish said driving connection.

15. In a transmission, in combination with driving and driven relatively rotatable members, an element carried by one of said members and axially shiftable toward the other member, said other member having an opening for receiving an axially tapered end portion of said element whereby to provide engageable coupling means for establishing a driving connection between said driving and driven members, synchronizing means disposed between said other member and said element and including a balking member adapted to be engaged by said end portion of said element upon movement towards said other member and having frictional engagement with said other member to synchronize said driving and driven members upon engagement of a friction face of said element with a friction face on said other member, said balking member being rotatable with said element and also being rotatable relative thereto within limits into and out of element-blocking position and being formed with a passage within which said end portion of said element may be received and is normally located out of the same and engageable with said balking member on one side or the other of said passage when out of alignment therewith prior to the synchronization of the speeds of said driving and driven members, and means for shifting said element toward said other member to engage and urge said balking member into frictional driving engagement with said other member to synchronize said driving and driven members and thereafter to rotate said balking member to align said passage with said element for passage of the latter therethrough into the passage of said other member to establish said driving connection.

DONALD W. KELBEL.

REFERENCES CITED

The following references are of record in the file of this patent:

UNITED STATES PATENTS

| Number | Name | Date |
| --- | --- | --- |
| 901,980 | Mayo et al. | Oct. 27, 1908 |
| 918,610 | Tschantz | Apr. 20, 1909 |
| 1,078,840 | Druschel | Nov. 18, 1913 |
| 1,909,644 | Westcott | May 6, 1933 |
| 2,022,095 | Thompson | Nov. 26, 1935 |
| 2,221,899 | White et al. | Nov. 19, 1940 |
| 2,290,696 | Margolis | July 21, 1942 |

FOREIGN PATENTS

| Number | Country | Date |
| --- | --- | --- |
| 203,731 | Great Britain | Sept. 10, 1923 |